United States Patent [19]

Ohtagaki et al.

[11] Patent Number: 4,624,478
[45] Date of Patent: Nov. 25, 1986

[54] SUSPENSION DEVICE FOR AUTOMOBILE

[75] Inventors: Shigeki Ohtagaki; Shunichi Wada; Yasuaki Hata, all of Himeji; Shozo Takizawa; Mitsunori Maruyama, both of Okazaki, all of Japan

[73] Assignees: Mitsubishi Denki Kabushiki Kaisha; Mitsubishi Jidosha Kogyo Kabushiki Kaisha, both of Tokyo, Japan

[21] Appl. No.: 643,540

[22] Filed: Aug. 23, 1984

[30] Foreign Application Priority Data

Aug. 25, 1983 [JP] Japan ................... 58-156803

[51] Int. Cl.[4] .......................................... B60G 11/26
[52] U.S. Cl. .................... 280/707; 280/714
[58] Field of Search ............... 280/707, 714, DIG. 1; 180/41; 188/319, 299, 285; 267/64.16, 64.25; 364/424

[56] References Cited

U.S. PATENT DOCUMENTS

| 3,165,363 | 1/1965 | Behles | 280/DIG. 1 |
| 3,420,341 | 1/1969 | Keehn, II | 188/299 |
| 4,396,202 | 8/1983 | Kami et al. | 280/714 |

FOREIGN PATENT DOCUMENTS

| 0080291 | 11/1982 | European Pat. Off. |
| 2604809 | 8/1977 | Fed. Rep. of Germany |
| 2716476 | 10/1978 | Fed. Rep. of Germany |
| 3215614 | 2/1983 | Fed. Rep. of Germany |
| 3246697 | 7/1983 | Fed. Rep. of Germany |
| 2362017 | 8/1977 | France |
| 2467720 | 10/1980 | France |
| 47048 | 3/1982 | Japan | 188/319 |
| 2084762 | 8/1981 | United Kingdom |

OTHER PUBLICATIONS

Patent Abstracts of Japan vol. 6, No. 267, 25th Dec. 1982, (M-182) (1145); & JP-A-57-158113 (Hinosidosha) 29-09-82.
Automative Engineer, vol. 8, No. 2, Apr.-May 1983, Southend-on-Sea, GB; "Electronic Modulated Suspension", p. 12.
IEE 181 Automotive Electronics 29 Oct.-2 Nov., '79 "Electronic Control Concepts for Suspension Systems".
Patent Abstracts of Japan vol. 7, No. 217, 27th Sep. 1983, (M-245) (1362); & JP-A-58-112819 (Nippon Denso) 05-07-83.

Primary Examiner—John J. Love
Assistant Examiner—Ross Weaver
Attorney, Agent, or Firm—Oblon, Fisher, Spivak, McClelland, & Maier

[57] ABSTRACT

In a suspension device for automobile having a shock absorber provided with a damping force change-over mechanism and a suspension spring provided with a spring constant change-over mechanism, a power source to perform both the changing-over of the damping force of the shock absorber and the spring constant of the suspension spring depends on a fluid pressure source equipped in the automobile and the fluid pressure from the pressure source is controlled by an electromagnetic valve.

8 Claims, 7 Drawing Figures

SUSPENSION DEVICE FOR AUTOMOBILE

BACKGROUND OF THE INVENTION

1. Field of the Invention

This invention relates to a suspension device for automobile in which characteristic of the suspension device is changed over by changing pressure of a fluid depending on cruising condition of an automobile or preference of a driver.

2. Discussion of the Background

There is contradiction between the characteristic of the suspension device, e.g., damping factor characteristic of a shock absorber and spring characteristic of a suspension spring, when comfortableness in vehicle riding is considered to be serious and those of the suspension device when steering stability is considered to be serious. Accordingly, it is difficult to simultaneously satisfy both the characteristics. However, recent development of electronics allows various proposals of systems in which characteristic of a suspension device is changed over depending on necessity. Generally, there have been known methods of changing over the characteristic of the suspension device as follows. For changing over the damping force of a shock absorber, a rod arranged at the central portion of the shock absorber is rotated so that the diameter of an orifice is changed to be large or small. For changing over the spring characteristic of a spring for suspending a vehicle body, connecting paths of a plurality of air chambers provided in the suspension device are communicated or interrupted by turning movement of a central rod to thereby change over a spring constant. Thus, changing-over of the characteristic of the suspension device is realized by turning the rod. There is a proposal of a suspension device in which a rotary solenoid having direct connection to an end of the rod is used as an actuator for rotating the rod. A suspension device provided with a rotary solenoid as an actuator has, however, such drawback that the structure of the solenoid is complicated; large stroke can not be obtained and force for rotating the rod is weak and that it is difficult to miniaturize the actuator which is essential to reduce a space for installation.

SUMMARY OF THE INVENTION

It is an object of the present invention to eliminate the disadvantages of the conventional device and to provide a suspension device for automobile in which a cylinder is used as an actuator to control fluid pressure such as air pressure by means of an electromagnetic valve and utilize the fluid pressure to thereby miniaturize and simplify the structure of the actuator itself while the length of stroke and the output of the actuator can be determined as desired.

The foregoing and the other objects of the present invention have been attained by providing a suspension device for automobile comprising a pressure source, an electromagnetic valve for connecting and breaking fluid pressure of the pressure source, an actuator for converting the fluid pressure transmitted through the electromagnetic valve into a kinetic movement, a rod turned by the movement of the actuator, a shock absorber having a damping force changed by turning the rod and a suspension spring having a spring constant changed by the turning the rod.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

An embodiment of the suspension device for automobile according to the present invention will be described with reference to drawings.

Figure 1:
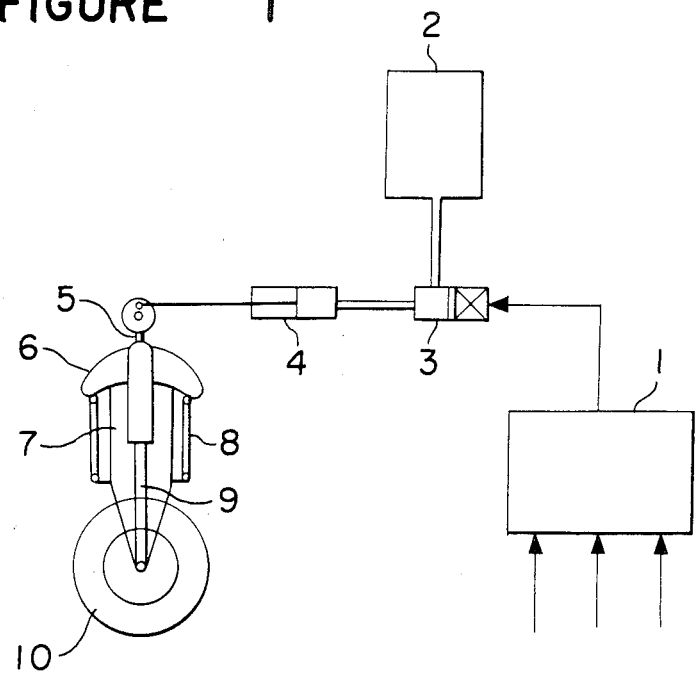
FIG. 1 is a schematic diagram showing an embodiment of the suspension device of the present invention.

FIG. 1 shows schematically a construction of one embodiment of the suspension device of the present invention. Condition of a suspension device is detected by sensors and outputs of the sensors are received in a control unit 1. When the suspension characteristic of the automobile have to be changed to hard mode by information of the sensor outputs, current is fed from the control device 1 to a solenoid valve 3 to open an air passage whereby a cylinder 4 is actuated by fluid pressure of a pressure source 2. Acutation of the cylinder 4 causes a rod 5 to turn around its own axis to change a spring constant and a damping force to hard mode. When the condition to render the suspension characteristic to be hard mode is eliminated, current feeding to the solenoid valve is stopped to turn off the air passage and air in the cylinder is discharged outside; thus, the rod is returned to the original position whereby the spring constant and the damping force are changed to soft mode. A reference numeral 6 designates an auxiliary air chamber; a numeral 7 designates an air chamber for air spring; a numeral 8 designates a coil spring; a numeral 9 designates a shock absorber and a numeral 10 designates wheels.

Figure 2:
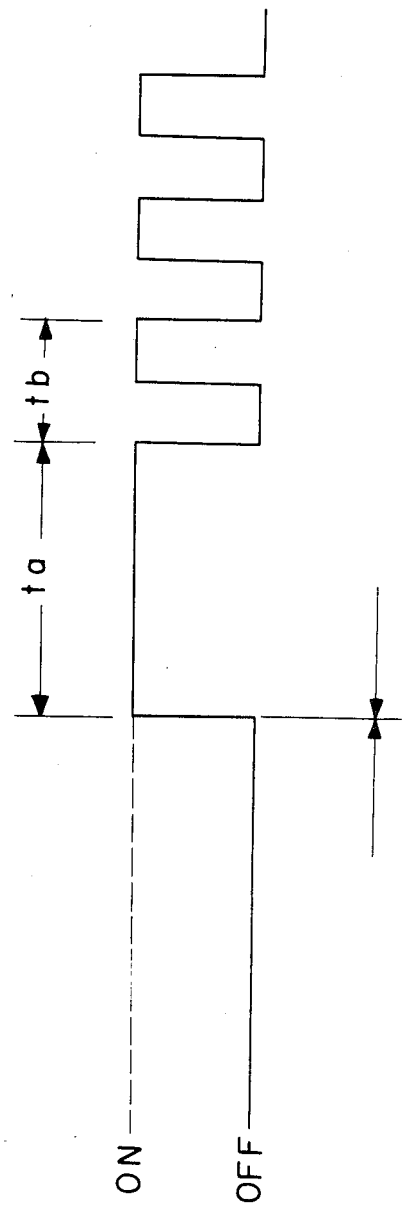
FIG. 2 is a diagram showing a conduction mode of a solenoid valve used in the suspension device of the present invention.

In FIG. 1, the control device 1 receives input information from several types of sensors for foreseeing or detecting variations in behavior of the vehicle body whereby it keeps correct information on the behavior of the vehicle body. When the control device 1 determines to change suspension characteristic to hard mode (for example, when a brake is operated), the solenoid valve 3 is excited to open a pressure conduit. In this case, current fed to the solenoid valve 3 undergoes duty control by the control device 1 in such a manner that as shown in FIG. 2, the solenoid valve 3 is initially in continuously conductive state for a time period $t_a$ and thereafter, the current is intermittently fed to it at a period $t_b$ for repeated ON-OFF operation of the valve 3. Accordingly, response property of the solenoid valve 3 at its turning-on is improved and current required for sustaining the solenoid valve is reduced. Thus, by feeding current to the solenoid valve 3, the pressure conduit is opened and fluid pressure in the pressure source 2 is transmitted to the cylinder 4 and the cylinder 4 actuated by the fluid pressure turns the rod 5 of the suspension device.

Figure 3:
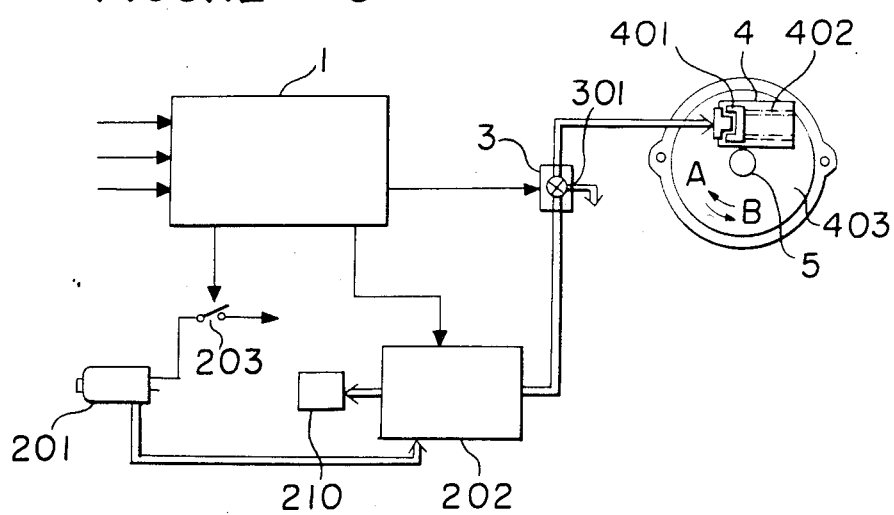
FIG. 3 is a diagram showing a construction of a pressure source and an actuator according to the present invention.

FIG. 3 shows in more detail a construction of an actuator having the rod 5 turned by the fluid pressure of the pressure source.

The pressure source 2 is constituted by a compressor 201 and a reserve tank 202 comnunicated with the compressor 201. The compressor 201 is electrically connected to a power source through a switch 203 which is, in turn, controlled by the control device 1. Air stored in the reserve tank 202 is, on one hand, supplied to an air valve 210 used for a road clearance adjusting device and on the other hand, is supplied through the solenoid valve 3 to the cylinder 4 of the actuator to turn the rod 5.

In air feeding operations, the solenoid valve closes a discharge port 301 and accordingly, air is fed from the reserve tank 202 to the cylinder 4. Pressurized air causes a piston 401 to move against a return spring 402 whereby the rod 5 firmly connected to a plate 403 which is, in turn, connected to the piston, is turned in the direction of the arrow mark A.

In discharge operations, the solenoid valve 3 opens the discharge port 301 to discharge air in the cylinder 4 whereby the rod 5 is turned in the direction of the arrow mark B.

Figure 5:
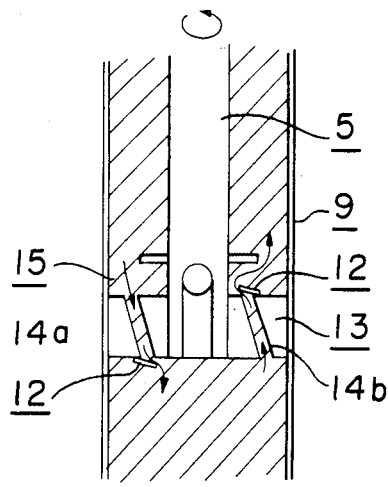
FIGS. 4 and 5 are respectively schematic views showing a construction and operations of a damping force change-over mechanism.
Figure 4:
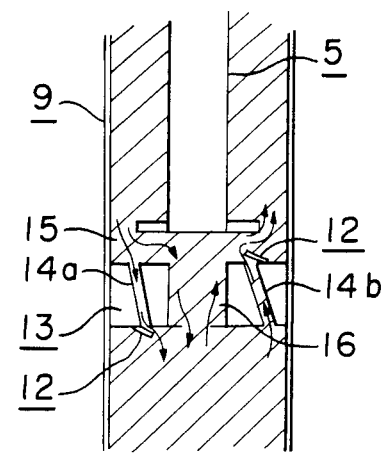

Changing-over of the damping force and the air spring constant is carried out by turning the rod 5 as follows. First, the damping force of the shock absorber 9 is normally set at low damping force side as shown in FIG. 4 and fluid (oil) in the shock absorber 9 freely passes through passages 14a, 14b and a by-pass passage 16, as the result that the area of an orifice 15 is broad. Accordingly, the fluid (oil) passes through the orifice 15 relatively freely to thereby reduce the damping force. When the rod 5 is turned to give condition as shown in FIG. 5, the by-pass passage 16 is closed and the fluid flows only by means of the passages 14a, 14b, whereby flow resistance in the orifice 15 increases when the fluid passes therethrough, to thereby increase the damping force. A reference numeral 12 designates a valve for controlling the flow direction of the fluid and a numeral 13 designates a piston. In FIGS. 4 and 5, the left side positions of the shock absorber with respect to the center line respectively show an elongation process and the right side portions thereof respectively show a contraction process.

Figure 6:
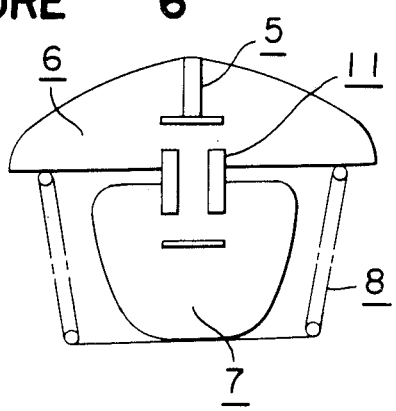
FIGS. 6 and 7 are respectively schematic views showing a construction and operations of a spring constant change-over mechanism.
Figure 7:
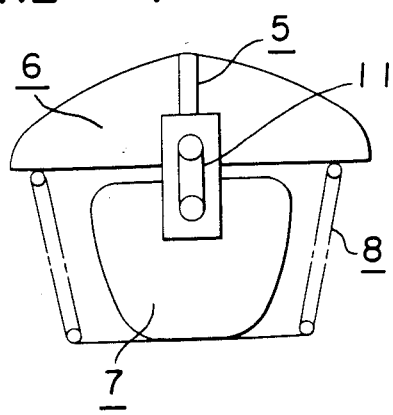

The spring constant change-over device has a connecting path 11 which is formed between the air spring chamber 7 and the auxiliary air chamber 6 to communicate therewith as shown in FIG. 6. When air spring constant has to be increased, the rod is turned to close the connecting path 11 from the condition shown in FIG. 7 to reduce the capacity of the air spring chamber.

In the present invention, the pressure source 2 containing fluid, the solenoid valve 3 and the control device 1 may be installed in desired vacant spaces in the engine room or the car cabin and only the air actuator having simple construction may be attached to the suspension device. Accordingly, there is avoidable a problem that the suspension device becomes a large size which is caused by fitting a large sized actuator on the suspension device as is in the conventional suspension device.

As described above, the suspension device of the present invention is characterized by changing-over the damping force and the spring constant of the suspension device by turning a rod. In this case, an actuator for turning the rod utilizes fluid pressure such as air pressure, on account of which the actuator is miniaturized and simplified, while an output pressure and a stroke can be determined as desired. Further, when the pressure source is used in common to a device for adjusting road clearance of the vehicle body which utilizes air pressure, an air source for the suspension device is eliminated. Further, the suspension device of the present invention can be controlled by a small power, while giving a good response characteristic by rendering the solenoid valve for opening and closing the fluid passage to be an excessively exciting condition.

We claim:

1. A suspension device for an automobile, comprising a pressure source, an electromagnetic valve for transmitting and breaking fluid pressure of said pressure source, an actuator for converting the fluid pressure transmitted through said electromagnetic valve into a kinetic movement, a rod turned by the movement of said actuator, a shock absorber having a damping force changed by turning said rod and a suspension spring having a spring constant changed by the turning said rod, wherein said pressure source is used in common to a pressure source for a road clearance adjusting device for adjusting a change in road clearance.

2. The suspension device for automobile according to claim 1, wherein said pressure source uses air.

3. The suspension device for automobile according to claim 2, wherein said actuator is constituted by a cylinder, a piston placed in said cylinder to be moved by fluid pressure supplied from said pressure source and means for converting movement of said piston into turning motion of said rod.

4. The suspension device for automobile according to claim 1, wherein said shock absorber comprises a cylinder containing therein a control fluid, a piston movable in said cylinder, a main passage and a by-pass passage passing through said piston, and an interrupting member for interrupting said by-pass passage, in which said by-pass passage is opened and closed by turning said rod to perform changing-over of the damping force of the device.

5. The suspension device for automobile according to claim 1, wherein said suspension spring comprises a coil spring and an air spring, in which a spring constant of said air spring is changed over by connecting and breaking a passage between a main air chamber and an auxiliary air chamber by controlling the turning movement of said rod.

6. The suspension device for automobile according to claim 1, wherein said electromagnetic valve is controlled under a duty control in which the valve is in continuous conductive condition for an initial predetermined period and thereafter, current is intermittently fed to it at a predetermined period.

7. A suspension device for an automobile, comprising a pressure source, an electromagnetic valve for transmitting and breaking fluid pressure of said pressure source, an actuator for converting the fluid pressure transmitted through said electromagnetic valve into a kinetic movement, a rod turned by the movement of said actuator, a shock absorber having a damping force changed by turning said rod and a suspension spring having a spring constant changed by turning of said rod, wherein said shock absorber comprises a cylinder containing therein a control fluid, a piston movable in said cylinder, a main passage and a by-pass passage passing through said piston, and an interrpting member for selectively interrupting said by-pass passage depending on the turning movement of said rod and said suspension spring comprises a coil spring and an air spring, a spring constant of said air spring being changed over by connecting and breaking a passage between a main air chamber and an auxiliary air chamber by controlling the turning movement of said rod, and wherein said pressure source is used in common to a pressure source for a road clearance adjusting device for adjusting a change in road clearance.

8. The suspension device for automobile according to claim 7, wherein said electromagnetic valve is controlled under a duty control in which the valve is in continuous conductive condition for an initial predetermined period and thereafter, current is intermittently fed to it at a predetermined period.

* * * * *